(12) United States Patent
Lyon et al.

(10) Patent No.: US 6,431,758 B1
(45) Date of Patent: Aug. 13, 2002

(54) SLIDING-CONTACT BEARINGS WITH DIAMOND PARTICLES

(75) Inventors: John Lyon; Fatima Rutherford, both of Prestwick; Ian David Massey, Rugby, all of (GB)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/601,916

(22) PCT Filed: Feb. 12, 1999

(86) PCT No.: PCT/GB99/00448

§ 371 (c)(1),
(2), (4) Date: Sep. 6, 2000

(87) PCT Pub. No.: WO99/41512

PCT Pub. Date: Aug. 19, 1999

(30) Foreign Application Priority Data

Feb. 14, 1998 (GB) .............................................. 9803213

(51) Int. Cl.⁷ .............................................. F16C 33/24
(52) U.S. Cl. .................................... 384/276; 384/907.1
(58) Field of Search ................................. 384/276, 297, 384/907, 907.1, 912, 913

(56) References Cited

U.S. PATENT DOCUMENTS

| | | | |
|---|---|---|---|
| 3,936,247 A | 2/1976 | Tschirky et al. | 418/48 |
| 4,345,798 A * | 8/1982 | Cortes | 384/907.1 |
| 4,525,417 A | 6/1985 | Dimigen et al. | 428/244 |
| 4,756,631 A * | 7/1988 | Jones | 384/95 |
| 4,828,728 A | 5/1989 | Dimigen et al. | 508/107 |
| 4,960,643 A * | 10/1990 | Lemelson | 428/408 |
| 5,108,813 A * | 4/1992 | Noda et al. | 428/141 |
| 5,176,455 A | 1/1993 | Strangeland | 384/276 |
| 5,433,531 A * | 7/1995 | Thompson | 384/276 |
| 5,451,352 A * | 9/1995 | Cook | 264/102 |
| 6,165,616 A * | 12/2000 | Lemelson et al. | 428/408 |

FOREIGN PATENT DOCUMENTS

| | | |
|---|---|---|
| GB | 1311854 | 7/1969 |
| JP | 06116577 | 4/1994 |

OTHER PUBLICATIONS

PCT International Search Report for PCT/GB99/00448 dated May 27, 1999.

* cited by examiner

Primary Examiner—Thomas R. Hannon
(74) Attorney, Agent, or Firm—Rader, Fishman & Grauer PLLC

(57) ABSTRACT

A plain bearing comprises a strong backing, a layer of silver and an overlay coating of a metal containing diamond particles. The diamond-containing metal may be of silver, lead, lead/tin, lead/indium or lead/tin/copper. The diamond may be natural or synthetic.

17 Claims, 2 Drawing Sheets

SLIDING-CONTACT BEARINGS WITH DIAMOND PARTICLES

This invention relates to plain bearings of the kind used in internal combustion engines. More particularly it relates to bearings for use as crankshaft (main) bearings and/or big end bearings.

Numerous metal and alloy combinations have been proposed. It is common practice to employ a strong backing material such as steel onto which is cast or otherwise affixed one or more primary layers of a bearing metal or alloy. It is common practice to provide the working face of the primary layer with an overlay coating of minimal thickness, to impart a degree of conformability and lubricity and also the ability to embed particulate debris which is generally found in engines and which can cause serious damage and/or premature wear problems, or even seizure.

For example, one well known bearing material is based on a steel backing layer onto which is cast a bronze layer, the latter serving as the primary layer referred to earlier. The primary layer is then given an electrodeposited overlay coating of lead and indium. (It will be understood that ancillary steps such as forming, shaping and machining to final dimensions may be required, but as these are all well known in the art, they need not be discussed in detail in this specification).

In addition to achieving wear resistance and conformability, a plain bearing for automotive engine use should also exhibit resistance to cavitation erosion due to the behaviour of the oil film under conditions of heat and cyclic pressures. Cavitation erosion is a particularly serious problem at very high engine speeds and loadings. High speed in this context means up to and in excess of 10,000 r.p.m. and engines capable of operation at such speeds are generally run using synthetic lubricants, the latter apparently considerably exacerbating the erosion problem.

The use of relatively exotic metals such as silver has been proposed; silver is/was used in certain aircraft engines. It is an excellent metal for bearing purposes, but is prone to seizure if run under unloaded conditions. It would normally be used in a relatively thick, monolithic layer.

A further problem for plain bearings in automotive engines arises from the surface finish of the shaft which the bearing supports, or with which the bearing working surface is in contact. Surface irregularities can and do cause damage to the bearing, especially during the "running-in" phase of operation. To counter this it has been proposed to incorporate an amount of very fine, hard abrasive particles into the working surface of the bearing, more especially into the overlay coating. It is believed that such particles not only serve to "polish" the shaft, but also to strengthen the soft overlay so that damage to it is greatly reduced. Titanium carbide is a known material for this purpose.

It is an object of the present invention to provide a bearing having improved performance at engine speeds in excess of 10,000 r.p.m.

According to a first aspect of the present invention, there is provided a bearing material comprising a metal having therein diamond particles.

In accordance with a second aspect of the present invention, a bearing comprises a strong backing, a layer of silver or a silver alloy and an overlay coating layer of a metal containing diamond particles.

A structural bronze bearing material layer may be interposed between the strong backing (normally of steel for example) and the silver layer. In that case, the silver may be applied over a nickel interlayer to improve adhesion and minimise the formation of undesirable intermetallic compounds. Such a nickel layer will, in fact, normally be used on top of bronze. The diamond-containing metal overlay layer may be silver, pure lead or a lead/indium mix, or it may be lead/tin or lead/tin/copper.

It will be appreciated that the invention in one embodiment may be regarded as comprising an overlay having two-layers, in which both layers may be principally of silver.

The second or outermost overlay layer adjacent a shaft journal in use is preferably applied by electroplating; it will be typically only about 1–5 microns thick, and the diamond particles should preferably be in the size range 0.1–2 microns. The underlying silver or silver alloy layer may be of the order of 5–20 microns thick, whilst the nickel interlayer (if used) will be typically 1–2 microns thick. The strong backing material may be of an appropriate thickness, but 1–2 mm would be suitable for many applications. The structural bronze layer (if used) may have a thickness in the range of 200–300 microns for example.

Suitable silver alloys may comprise silver and lead for example.

The diamond particles may be natural or synthetic and may be present in an amount of from about 0.1 volume % to 3 volume %. A more preferred range of diamond content may be from 0.25 to 1 volume %.

Surprisingly small amounts of diamond particles are effective. For example, 0.15% by weight (about 0.5% by volume) gave satisfactory results.

The performance of a bearing according to the present invention is good, especially at speeds in excess of 10,000 r.p.m. and under heavy loading.

In order that the present invention may be more fully understood, examples will now be described by way of illustration only with reference to the accompanying drawings, of which:

Figure 1:
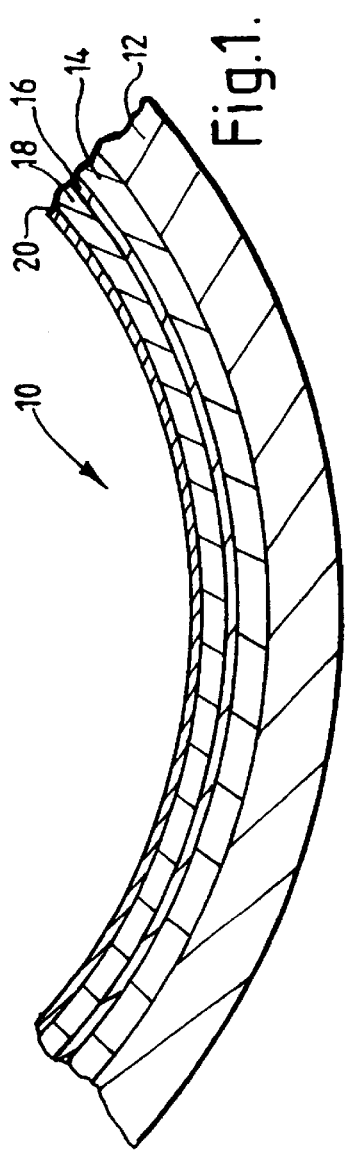
FIG. 1 shows a cross-section through part of a plain journal bearing according to one embodiment of the present invention.

FIG. 1 shows a cross section showing the general construction of part of a semi-cylindrical half bearing 10 according to an embodiment of a bearing according to the present invention the manufacture of which is described in more detail below. The bearing 10 comprises a steel backing 12 having a thickness in the range from about 1 to 2 mm in thickness; a layer 14 of a leaded bronze material having a thickness in the range from about 200 to 300 $\mu$m; a thin electro-deposited interlayer coating 16 of about 1 to 2 $\mu$m thickness of nickel on top of the leaded-bronze layer 14; a layer 18 of silver of about 5 to 20 $\mu$m in thickness; and an outer layer 20 of about 1 to 3 $\mu$m thickness of a metal containing diamond particles (not shown). Effectively, the two layers 18, 20 make up the overlay layer per se (it will be appreciated that the constituent layers shown in FIG. 1 are not to scale).

EXAMPLE

A steel backing strip was coated with a layer of leaded-bronze by a conventional casting route. After machining down to final thickness and subjecting to the usual annealing treatment, the steel strip was 1.27 mm thick and the bronze layer was 250 microns thick. Half bearings were blanked from the strip, subjected to various forming and machining operations well known in the art, machined to size and finished by successive plating operations. Firstly, a nickel interlayer 2 microns thick was applied to provide better bonding for the next layer applied, which was a 15 micron electro-deposited overlay coating of substantially pure silver. A final overlay coating of lead containing 0.5% by volume of diamond particles of average size 0.5–1 microns was then applied on top of the silver. After conventional washing, drying and heat treatments, the half bearings were tested for wear resistance and fatigue strength.

The wear tests used a standard test rig previously used to test prior art materials. Briefly, the standard test procedure involved exposing the pre-weighed bearing to a revolving eccentric journal of a standard steel shaft having a surface roughness in the range 0.1 RA to 0.2 RA and rotating at 1000 r.p.m. in oil at 140° C. for 30 minutes. The shaft journal was 6.7 mm smaller in diameter than the test bearing. The applied load was 3.5 Kg. The volume loss of the overlay was then determined.

Firstly, a conventional bearing previously used for high speed, high load applications was tested. It had a lead-indium overlay, containing about 7% indium.

The test was repeated with a bearing as per the above Example.

Figure 2:
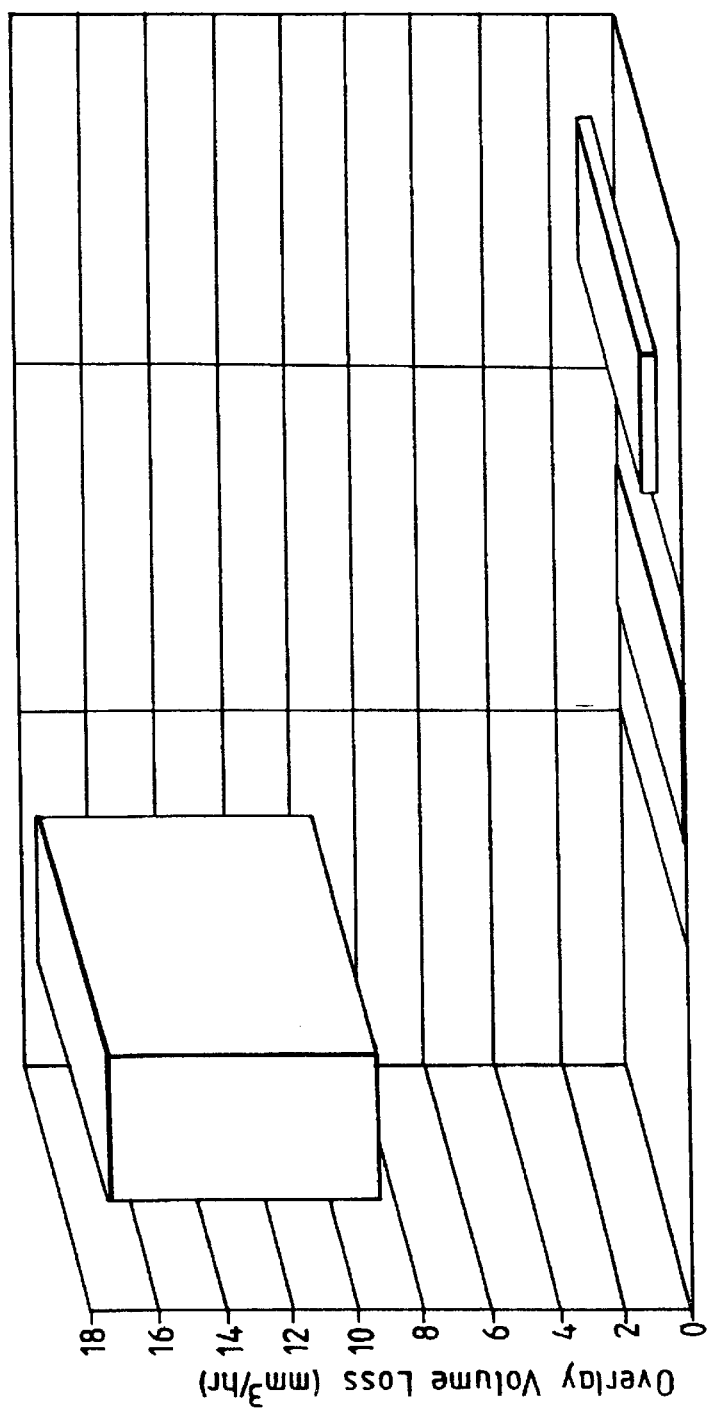
FIG. 2 shows a graphical representation of wear results of overlay alloys according to the present invention and for other conventional overlay alloys.

The conventional bearings exhibited a volume loss of between 9 and 18 mm$^3$ per hour, but the bearing according to the invention exhibited a volume loss of 0.012 mm$^3$ per hour. These results are expressed graphically in FIG. 2 where the conventional material is in the left hand column and the inventive material in the centre column. The wear rate of the bearing material according to the present invention was by any standards negligible.

A further wear test was conducted by running a shaft which had previously been run against the diamond containing material of the present invention against a bearing having the conventional lead/7% indium overlay described above. The results are shown in the right hand column of FIG. 2. These results show a wear rate of about 1 mm$^3$/hr of overlay indicating that the shaft journal had been conditioned by polishing by the diamond containing material so as to be less abrasive.

Further tests to establish behaviour under conditions conducive to cavitation erosion damage were carried out on a test rig where the samples were subjected to ultrasonic vibration at a frequency of 20 kHz and amplitude of 15 microns peak-to-peak, for 3.5 minutes. In this test a transducer horn is positioned 1 mm above the surface of the test bearing and below the oil surface. Ultrasonic vibration of the horn tip induces vapour cavities in the oil, the collapse of which results in cavitation erosion of the bearing surface. In this test the samples were immersed in a synthetic oil of a kind used in racing engines. The results are depicted in histogram form in FIG. 3. The overlays tested were, from left to right in the Figure: the lead indium previously used in the wear test; lead/tin/copper (also used for high performance applications); and, the material of the present invention.

Figure 3:
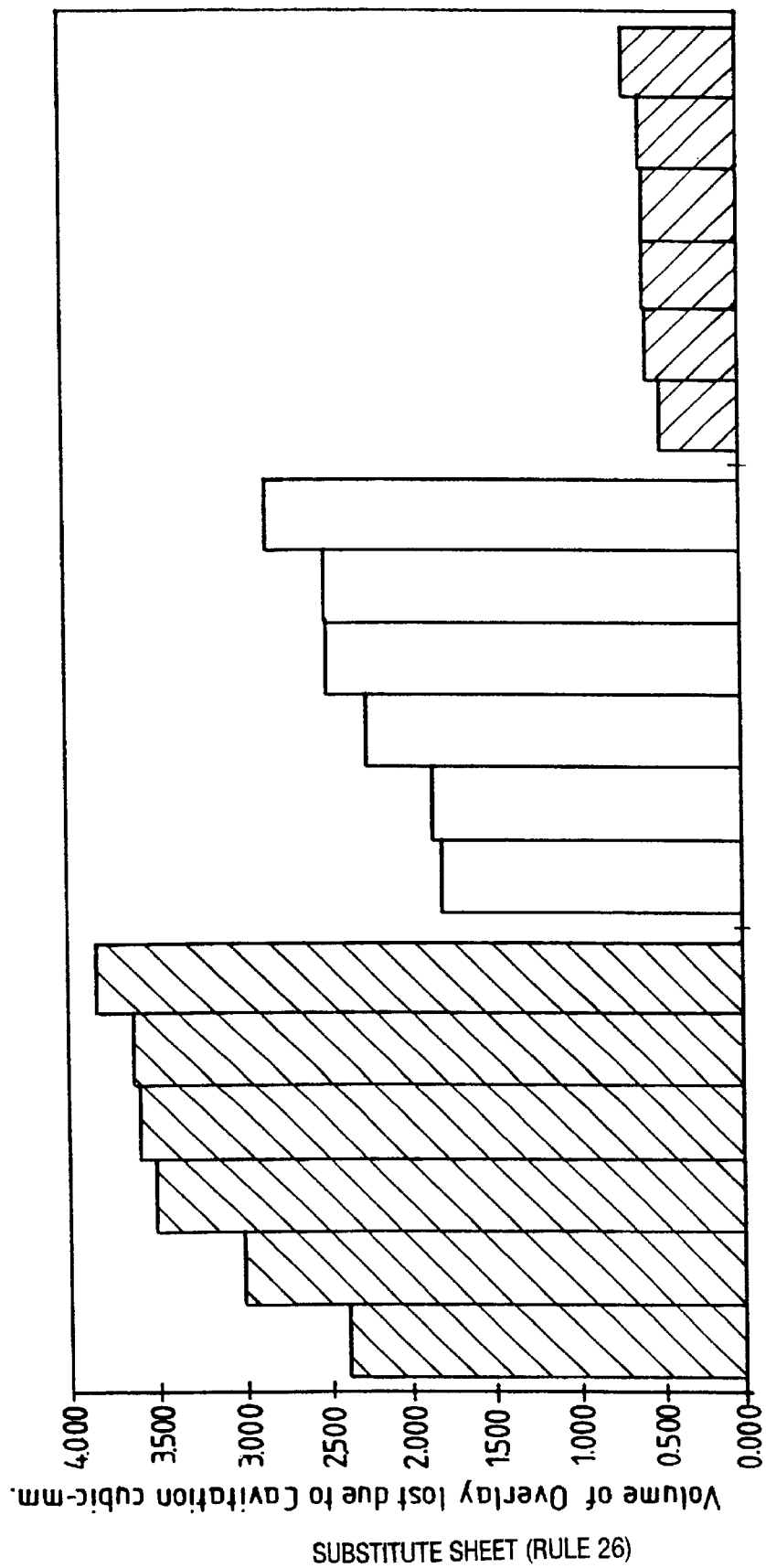
FIG. 3 which shows a histogram of cavitation erosion performance of overlay alloys according to the present invention and other overlay materials.

It is readily apparent from FIG. 3 that the volume loss was very significantly lower for the material of this invention.

Tests to establish relative resistance to seizure were carried out on a high speed test rig. This rig exposed the test samples to a load of 300 N at a shaft speed of 26 m/s (10710 rpm). The shaft had a diameter of 47.45 mm, a surface roughness <=0.2 RA. An initial "running-in" process consisted of subjecting the sample to 50 five second cycles. Then the sample was exposed to repeated 10 second cycles followed by a 5 second rest period. In the absence of any seizure, the test was stopped after 150 cycles.

The materials tested were a lead/tin/copper overlay material, a high specification bearing having a lining of aluminium 40% tin, and the overlay of this invention as described in the example above.

Two of the lead/tin/copper overlay bearings seized almost at start-up, before running-in was completed. A third seized after 5 cycles. The aluminium 40% tin bearings were much better and averaged 135 cycles, although some failed in the range 20–100 cycles. A small number failed much earlier. The overlay bearings of the present invention, on the other hand, mostly survived the test without any seizure at all, although one which did seize after 46 cycles did so in a smooth progressive way.

Fatigue testing was also carried out, using overlay materials according to the Example, lead/tin/copper material and a lead/indium material. Both of the latter are conventionally regarded as relatively high performance overlay materials.

In each case, fatigue was assessed by inspection for crack formation in the bearing surface following the application of a dynamic load to the bearing whilst in contact with a shaft rotating at 2960 r.p.m. in oil at a temperature of up to 150° C. Load on the test bearing occurs due to a 0.76 mm eccentric journal portion on the shaft which imposes a load via a hydraulic cylinder creating a pumping action. The load was increased progressively in 7 mPa increments after 20 hours running time at each load, bearing inspection taking place after each period of running at each load. If fatigue cracking has not occurred at the load then the next increment of 7 Mpa is applied for a further 20 hours and the process repeated until cracking occurred.

The load at which fatigue damage was observed was noted and the bearings tested were ranked as follows:
Lead/tin/copper=65 mPa
Lead/indium=75 mPa
Silver with diamond=117 mPa The latter result was extremely good and higher than any other overlay recorded.

From the test results it is apparent that bearings in accordance with the present invention have extremely good properties when compared with known bearings. This is particularly significant for extremely high speed applications. It is observed that the wear test results are especially good, the overlay volume loss being minimal to the point where it was scarcely visible to the naked eye, despite the test conditions being expressly designed to give accelerated wear. The cavitation erosion resistance was excellent and the seizure and fatigue resistance were also excellent.

What is claimed is:

1. A plain bearing comprising a strong backing, a layer of silver and an overlay coating layer of a metal containing diamond particles.

2. A plain bearing according to claim 1, wherein the overlay coating layer of metal includes silver.

3. A plain bearing according to claim 1, wherein the overlay coating layer is selected from the group consisting of pure lead, lead/indium, lead/tin and lead/tin/copper.

4. A plain bearing according to claim 1, wherein the overlay coating layer contains from about 0.1% volume to 3% volume of diamond particles.

5. A plain bearing according to claim 1, wherein the diamond particles have an average diameter in the range of about 0.1 to 2 microns.

6. A plain bearing according to claim 1, wherein the layer of silver is approximately 5 to 20 microns thick and the diamond-containing metal layer is approximately 1 to 3 microns thick.

7. A plain bearing according to claim 1, further including a structural bronze layer positioned between the strong backing and the layer of silver.

8. A plain bearing according to claim 7, wherein the structural bronze layer is approximately 200 to 300 microns in thickness.

9. A plain bearing according to claim 7, further including a nickel interlayer positioned between the structural bronze layer and the layer of silver.

10. A plain bearing according to claim 9, wherein the nickel interlayer is approximately 1 to 3 microns thick.

11. A plain bearing according to claim 1, wherein the layer of silver and the overlay coating layer are applied by electrodeposition.

12. A bearing material for use adjacent a shaft journal, the material comprising a metal therein having a plurality of diamond particles, wherein the metal contains from about 0.1% volume to 3% volume of diamond particles.

13. A bearing material for use adjacent a shaft journal, the material comprising a metal therein having a plurality of diamond particles, wherein the diamond particles have an average diameter in the range of about 0.1 to 2 microns.

14. A plain bearing comprising a strong backing, a layer of silver, a structural bronze layer between the strong backing and the layer of silver, a nickel interlayer between the structural bronze layer and the layer of silver, and an overlay coating layer of a metal containing diamond particles.

15. A plain bearing according to claim 14, wherein the overlay coating layer is a material selected from the group consisting of pure lead, lead/indium, lead/tin and lead/tin/copper.

16. A plain bearing according to claim 14, wherein the overlay coating layer comprises silver.

17. A plain bearing according to claim 14, wherein the overlay coating layer contains from about 0.1% volume to 3% volume of diamond particles.

\* \* \* \* \*

UNITED STATES PATENT AND TRADEMARK OFFICE
CERTIFICATE OF CORRECTION

PATENT NO.      : 6,431,758 B1                                                Page 1 of 1
DATED           : August 13, 2002
INVENTOR(S)     : John Lyon et al.

It is certified that error appears in the above-identified patent and that said Letters Patent is hereby corrected as shown below:

Column 4,
Line 51, replace "silver and an" with -- silver or a silver alloy and an --.

Signed and Sealed this

Twenty-fourth Day of December, 2002

JAMES E. ROGAN
*Director of the United States Patent and Trademark Office*